United States Patent
Schweid et al.

(10) Patent No.: US 10,616,447 B1
(45) Date of Patent: Apr. 7, 2020

(54) SCANNER APPROXIMATION OF AN IN-LINE SPECTROPHOTOMETER (ILS) IN DUPLEX SYSTEMS

(71) Applicant: Xerox Corporation, Norwalk, CT (US)

(72) Inventors: Stuart A. Schweid, Pittsford, NY (US); Michael B. Monahan, Webster, NY (US)

(73) Assignee: XEROX CORPORATION, Norwalk, CT (US)

(*) Notice: Subject to any disclaimer, the term of this patent is extended or adjusted under 35 U.S.C. 154(b) by 0 days.

(21) Appl. No.: 16/247,124

(22) Filed: Jan. 14, 2019

(51) Int. Cl.
| | | |
|---|---|---|
| G06K 15/02 | (2006.01) | |
| G01J 3/50 | (2006.01) | |
| G01J 3/42 | (2006.01) | |
| H04N 1/60 | (2006.01) | |
| H04N 1/00 | (2006.01) | |
| G01J 3/46 | (2006.01) | |

(52) U.S. Cl.
CPC .............. *H04N 1/6044* (2013.01); *G01J 3/42* (2013.01); *G01J 3/462* (2013.01); *G01J 3/50* (2013.01); *G06K 15/027* (2013.01); *G06K 15/1878* (2013.01); *H04N 1/00087* (2013.01)

(58) Field of Classification Search
CPC .............. H04N 1/6033; H04N 1/00005; H04N 1/00023; H04N 1/00034; H04N 1/00058; H04N 1/00082; H04N 1/6041; H04N 1/6044; H04N 1/00045; H04N 1/0005; H04N 1/60; H04N 1/6052; B41J 29/393; G01N 21/27; G06F 3/1431; G06K 15/02; G09G 2320/0233; G09G 2360/145

USPC ................ 358/1.9, 500, 504, 518; 382/167; 345/1.1, 1.3, 207, 589, 690; 347/19

See application file for complete search history.

(56) References Cited

U.S. PATENT DOCUMENTS

| | | | | |
|---|---|---|---|---|
| 5,884,118 A | * | 3/1999 | Mestha | H04N 1/4078 399/15 |
| 6,181,829 B1 | * | 1/2001 | Clark | H04N 1/40062 382/224 |
| 6,333,498 B1 | * | 12/2001 | Schweid | H04N 1/02815 250/208.1 |
| 6,449,389 B1 | * | 9/2002 | Schweid | G06T 5/008 382/164 |

(Continued)

OTHER PUBLICATIONS

G. Sharma and S. Wang, "Spectrum recovery from colorimetric data for color reproductions," in Proc. SPIE, Color Imaging: Device-Independent Color, Color Hardcopy, and Applications VII, vol. 4663, pp. 8-14 (2002).

(Continued)

*Primary Examiner* — Negussie Worku
(74) *Attorney, Agent, or Firm* — Fay Sharpe LLP

(57) ABSTRACT

A color management system acquires first color data for a color patch of a test pattern printed by a first image forming device on a recto side of a sheet, acquires second color data for the color patch in the test pattern printed by the first image forming device; and acquires third color data for a corresponding color patch in the test pattern printed by a second image forming device on a recto side of a sheet which has passed through the first image forming device. The system applies a correction to the third color data, which is a function of a difference between the first color data and the second color data and which may also be a function of a difference between the second color data and the third color data.

20 Claims, 6 Drawing Sheets

(56) References Cited

U.S. PATENT DOCUMENTS

| | | | | |
|---|---|---|---|---|
| 6,469,806 B1 * | 10/2002 | Richenderfer | ......... | G06K 15/12 358/3.02 |
| 6,535,633 B1 * | 3/2003 | Schweid | ............ | H04N 1/40062 358/515 |
| 6,549,658 B1 * | 4/2003 | Schweid | ............ | G06K 9/00456 382/173 |
| 6,631,215 B1 * | 10/2003 | Shiau | ......................... | G06T 5/20 358/3.27 |
| 6,734,991 B1 * | 5/2004 | Schweid | ............ | H04N 1/40062 358/3.06 |
| 8,616,668 B2 * | 12/2013 | Saito | ....................... | B41J 2/2146 347/15 |
| 9,004,637 B2 * | 4/2015 | Hattori | ....................... | B41J 2/12 347/14 |
| 9,110,394 B2 * | 8/2015 | Kim | ................... | G03G 15/0121 |
| 9,207,611 B2 * | 12/2015 | Woo | ................... | G03G 15/5058 |
| 9,347,873 B2 * | 5/2016 | Fujii | .................... | G01N 21/251 |
| 9,764,575 B2 * | 9/2017 | Yoshikawa | ............ | G06F 3/1208 |
| 9,854,133 B2 * | 12/2017 | Takemura | ............ | H04N 1/0005 |
| 2003/0007154 A1 * | 1/2003 | Tandon | ..................... | G01J 3/51 356/406 |
| 2010/0097669 A1 | 4/2010 | Roscoe et al. | | |
| 2012/0044540 A1 | 2/2012 | Dalal et al. | | |
| 2012/0300112 A1 * | 11/2012 | Natsume | ................... | G03B 5/02 348/336 |
| 2014/0301758 A1 * | 10/2014 | Kim | ................... | G03G 15/0121 399/301 |
| 2017/0048423 A1 * | 2/2017 | Itagaki | ................ | H04N 1/6041 |
| 2019/0155015 A1 * | 5/2019 | Sano | .................... | G02B 26/001 |

OTHER PUBLICATIONS

G. Sharma, S. Wang, D. Sidavanahalli, and K. T. Knox, "The impact of UCR on scanner calibration," in Final Prog. and Proc. IS&T's PICS Conf., pp. 121-124, Portland, OR, 1998.

G. Sharma, W. Wu, and E.N. Dulal, "The CIEDE2000 Color-Difference Formula: Implementation Notes, Supplementary Test Data, and Mathematical Observations," Color Res. and Application, vol. 30, No. 1, pp. 21-30 (2005).

\* cited by examiner

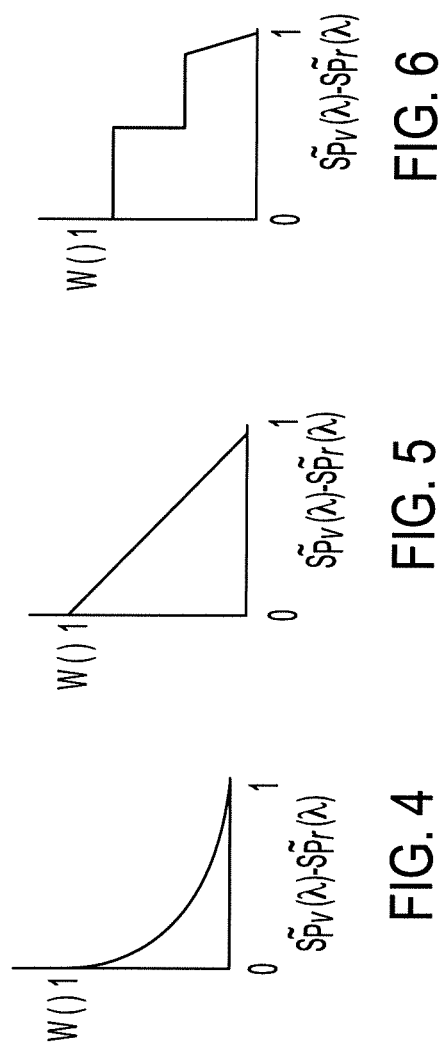

SCANNER APPROXIMATION OF AN IN-LINE SPECTROPHOTOMETER (ILS) IN DUPLEX SYSTEMS

BACKGROUND

The exemplary embodiment relates to color management in a printing system and finds particular application in connection with a system which combines conventional scanners with an in-line-spectrometer for color management in a duplex printing device.

Systems that perform inline color management for printing devices generally use an in-line spectrophotometer (ILS) to measure the spectral response of the printer for a given set of patches. The results may be used for color profiling or color calibration of the printing device. The ILS measures the color (e.g., in a device independent color space, such as L*a*b*) at one or more locations in a cross-process direction of the printing device. Inline spectrophotometers tend to be expensive and generally require tight specifications for mounting since each location uses a separate spectrophotometer component. For a duplex printing device, that prints on both sides of a sheet with separate marking engines, an ILS may be used for each side, increasing the cost further. One method to eliminate the need for an ILS is to train an RGB scanner to provide good spectral estimation using the measured mean RGB values of a patch. This provides reasonable spectral estimation, but the scanner accuracy is inferior to the spectrophotometer, which may measure 31 spectral value per patch, rather than three. Several machine learning-based training methods (e.g., using Gaussian regression) can give relatively good results nearing those of an ILS (1.5 ΔE2000, 95%)), but the performance of these methods is only good for the paper type and ink type that used during training occurred. More general techniques can be used over a wider array of papers and inks, but the errors associated with these methods is much larger (i.e. 4-5 ΔE2000, 95%). While a ΔE is generally considered an imperceptible color difference, higher values are generally associated with noticeable differences. ΔE2000 (or ΔE2k) is a color difference measure which measures the distance between two colors. This measure varies the weighting of L*, depending on where in the lightness range the color falls. 95% indicates the 95th percentile. See for example, G. Sharma and S. Wang, "Spectrum recovery from colorimetric data for color reproductions," in Proc. SPIE, Color Imaging: Device-Independent Color, Color Hardcopy, and Applications VII, vol. 4663, San Jose, Calif., 2002; G. Sharma, S. Wang, D. Sidavanahalli, and K. T. Knox, "The impact of UCR on scanner calibration," in Final Prog. and Proc. IS&T's PICS Conf., pp. 121-124, Portland, Oreg., 1998; R. Bala, "Device characterization," Chapter 5 of Digital Color Imaging Handbook, edited by G. Sharma, CRC Press, 2003. P. G. Roetling, J. E. Stinehour, and M. S. Maltz, "Color characterization of a scanner," in Proc. IS&T 7th Intl. Congress on Non-Impact Printing, pp. 443-451, 1991, for canner calibration methods.

INCORPORATION BY REFERENCE

The following references, the disclosures of which are incorporated in their entireties by reference, are mentioned:

U.S. Pub. No. 20120044540 A1, published Feb. 23, 2012, entitled COLOR MANAGEMENT AND CALIBRATION USING A SCANNER OR CAMERA, by Edul N. Dalai, et al., describes a computer-implemented method for color calibration and profiling of an output device. Measurements on printed test patches are made with an in-line full width array (FWA) or partial width array (PWA) scan bar and an in-line spectrophotometer to determine a correction factor for future scans.

U.S. Pub. No. 20090086292, published Apr. 2, 2009, entitled L*a*b* SCANNING USING RGB-CLEAR, by R. Victor Klassen, describes a system for reducing metamerism in a scanner or printer system by evaluating and manipulating unfiltered clear channel information. Using a four-channel model to predict CIE XYZ tristimulus values from RGB and clear, a linear model is generated based on a polynomial matrix conversion.

BRIEF DESCRIPTION

In accordance with one aspect of the exemplary embodiment, a color management system includes a first image forming device, which prints a test pattern comprising a plurality of color patches on a first side of a sheet. A second image forming device prints the test pattern on a second side of a sheet. The system includes a paper path on which sheets are transported between the first image forming device and the second image forming device. A first sensor acquires first color data for a color patch in the test pattern printed by the first image forming device. A second sensor acquires second color data for the color patch in the test pattern printed by the first image forming device. A third sensor acquires third color data for a corresponding color patch in the test pattern printed by the second image forming device. A processor executes instructions to apply a correction to the third color data. The correction is a function of a difference between the first color data and the second color data.

In accordance with another aspect of the exemplary embodiment, a color management method includes, with a first sensor, acquiring first color data for a color patch of a test pattern printed by a first image forming device, with a second sensor, acquiring second color data for the color patch in the test pattern printed by the first image forming device, and with a third sensor, acquiring third color data for a corresponding color patch in the test pattern printed by a second image forming device. With a processor, a correction is applied to the third color data, which is a function of a difference between the first color data and the second color data.

In accordance with another aspect of the exemplary embodiment, a color management system includes memory which stores instructions for: acquiring first color data for a color patch of a test pattern printed by an associated first image forming device on a recto side of a sheet; acquiring second color data for the color patch in the test pattern printed by the associated first image forming device; acquiring third color data for a corresponding color patch in the test pattern printed by an associated second image forming device on a recto side of a sheet which has passed through the first image forming device; and applying a correction to the third color data, which is a function of a difference between the first color data and the second color data. A processor executes the instructions.

BRIEF DESCRIPTION OF THE DRAWINGS

FIGS. 4-6 illustrate exemplary functions for reducing a color correction; and

DETAILED DESCRIPTION

A system and method are described which facilitate color management in a duplex printing device which avoids the need to provide an in-line spectrophotometer for performing color measurements on printed test patches produced by first and second side print engines.

The system and method employ a reference color measurement device, such as an in-line spectrophotometer (ILS) which performs color measurements on printed test patches produced by the first side print engine. A first color estimating device, such as a scanner, estimates color measurements on the same printed test patches produced by the first side marking engine. A second color estimating device, which is nominally identical to the first color estimating device, such as a second scanner, estimates color measurements on printed test patches produced by the second side print engine. The errors estimated for the first scanner provide a mechanism for calibration of the second scanner.

The system and method balance color adjustment for high image quality, while reducing costs.

As used herein, a "printer," or a "printing apparatus" refers to one or more devices used to generate printed media by forming images on print media, using a marking material, such as one or more colored inks or toner particles. The printer may be a digital copier, bookmaking machine, facsimile machine, multi-function machine, or the like, which performs a print outputting function. The print media may be sheets of paper, card, transparencies, parchment, film, fabric, plastic, photo-finishing papers, or other coated or non-coated flexible substrates suitable for printing.

A "duplex printer," as used herein, is printing apparatus which is configured for printing on opposite sides (recto and verso) of the same sheet of print medium, using first and second print engines. As used herein, the recto side is the first side of the sheet to be printed and the verso side is the opposite side, i.e., the second side of the sheet to be printed.

The "process direction" refers to the direction in which a sheet travels along a paper path during the printing process. The "cross-process direction" refers to the direction perpendicular to the process direction, in the plane of the sheet.

While some components of the printer are described herein as modules, this is not intended to imply that they are separately housed from each other and in some embodiments, may be otherwise separated into different housings or contained in a single printer housing.

Figure 1A:
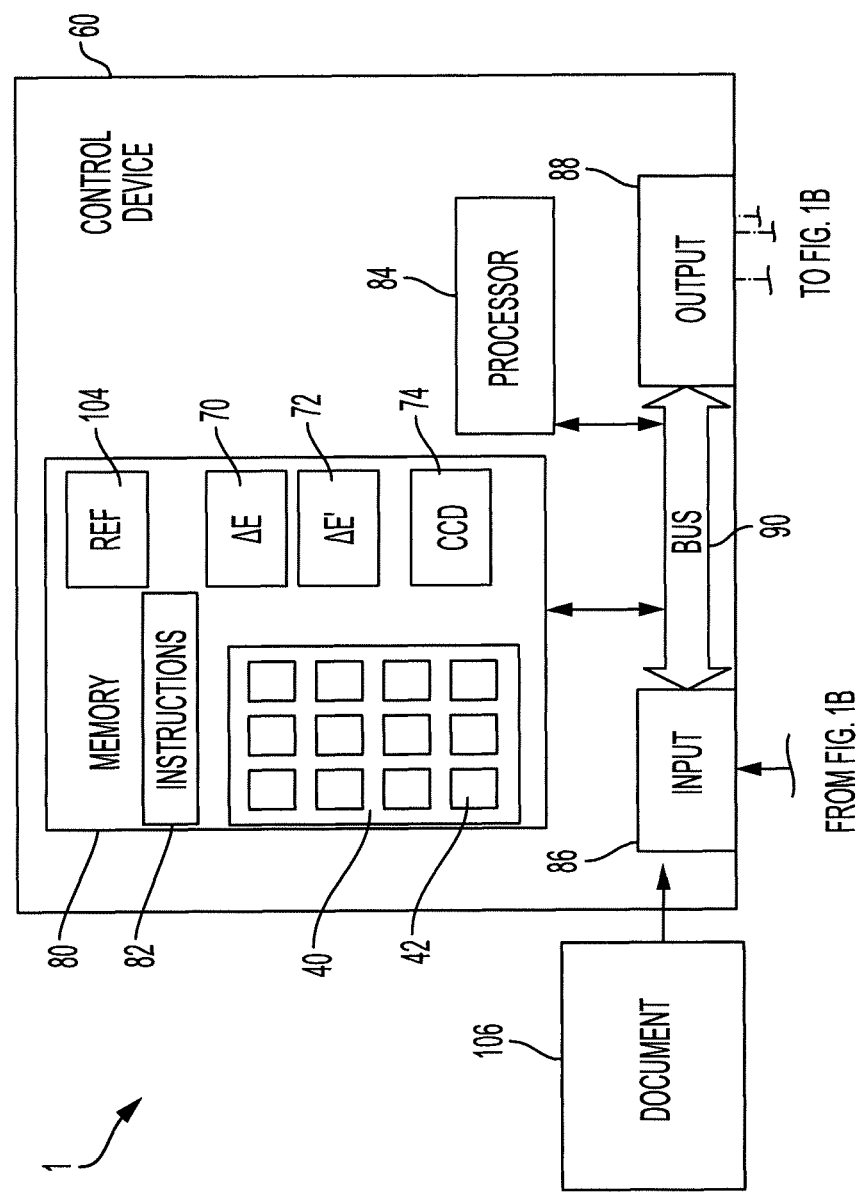
FIG. 1, which is split into FIGS. 1A and 1B for ease of illustration, is a functional block diagram of an illustrative color management system in accordance with a first aspect of the exemplary embodiment.
Figure 1B:
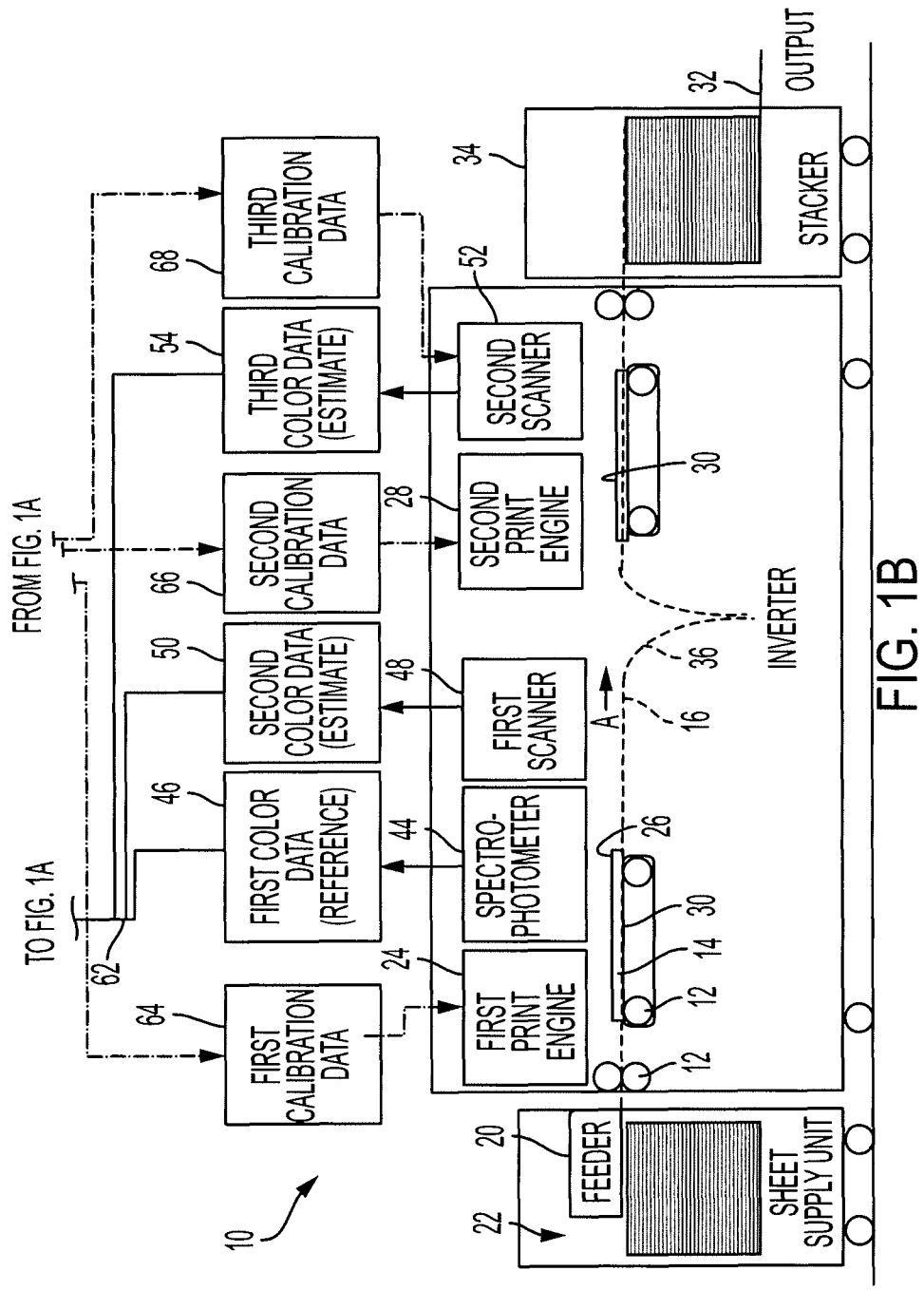

With reference to FIG. 1, a color management system 1 includes a printing apparatus (or "printer") 10 (FIG. 1B), such as an inkjet printing apparatus. The printer 10 includes a sheet media transport mechanism 12 which transports sheets 14 of print media, such as paper, plastic, or card, in a downstream direction A along a paper path 16. The transport mechanism 12 may include various transport members, such as drive rollers, idler rollers, conveyor belts, stationary baffles and/or other transport members. A sheet media feeder 20 feeds the sheets 14 singly from a sheet media supply 22 onto the paper path 16.

The transport mechanism 12 conveys the sheets 14 from the sheet media feeder 20 to a first print engine 24, which applies an image to a first (recto) side 26 of each sheet, using a marking material, such as one or more inks or toners. The transport mechanism 12 conveys the printed sheets 14 from the first print engine 24, to a second print engine 28, which applies an image to a second (verso) side 30 of each sheet, using a marking material, such as one or more inks or toners. The transport mechanism 12 conveys the duplex-printed sheets 14 from the second print engine 28 to an output device 32, such as a tray, optionally via one or more intermediate components, such as the illustrated stacker 34. An inverter 36, positioned in the paper path between the print engines 24, 28 inverts the sheets so that the unprinted (verso) side is uppermost.

The exemplary print engines 24, 28 use a plurality of marking materials, such as cyan, magenta and yellow (C, M, and Y) and optionally black (K) inks or toners for rendering image on the sheets and may receive color signals for each of the marking materials used. The print engines 24, 28 should be substantially identical devices, using the same set of marking materials.

For color management, such as color calibration of the print engines, generating a destination profile for the one of the print engines, or checking color performance of one of the print engines against predetermined specifications, a document comprising a fixed test pattern 40 (FIG. 1A), which includes a set of patches 42 of different, predefined colors is provided to the print engines 24, 28. The print engines 24, 28 both print the same test pattern 40, e.g., on opposite sides 26, 30 of the same sheet or on different sheets.

A first color measurement device (sensor) 44, such as an in-line spectrophotometer (ILS), which serves as a reference color measurement device, is positioned adjacent the paper path 16, downstream of the first print engine 24. The ILS 44 obtains first color data 46, such as color measurements in a first color space, for the first side 26 of the sheet 14 on which the test pattern 40 has been printed. For example, the spectrophotometer may illuminate the patches with light in the visible range of the spectrum and acquire reflectance measurements from the reflected light, at a set of specific spectral wavelengths, such as at least ten, or at least twenty wavelengths. For example, at each of at least 10 wavelengths, the reflectance is measured at a specified angle. In some embodiments, the reflectance measurements may be converted to a device independent color space, such XYZ or L*a*b*. A second color measurement device (sensor) 48, such as a first scanner, is positioned adjacent the paper path 16, downstream of the first print engine 24. The first scanner 48 obtains second color data 50, such as color measurements in a second color space, on the first side 26 of the sheet 14 on which the test pattern has been printed by the first print engine 24. The second color space may be a device-dependent color space, such as RGB. The RGB color data may be converted to an estimated reflectance value for each of the wavelengths measured by the ILS. The color data 50 is considered as a spectral estimate of the first (reference) color data 46. A third color measurement device (sensor) 52, such as a second scanner, is positioned adjacent the paper path 16, downstream of the second print engine 28. The second scanner 52 obtains third color data 54, such as color measurements in the second color space, on the second side 30 of the sheet 14 on which the test pattern has been printed by the second print engine 28. The third color data (e.g., RGB color data) may be converted to an estimated reflectance value for each of the wavelengths measured by the ILS. The method for conversion of the third color data to estimated reflectance is intended to be identical to the method used for conversion of the second color data to estimated reflectance for the second color measurement device. The third color data 54 is considered as a spectral estimate of the color data which would be obtained if a second reference device, identical to the first reference device 44, had been used to obtain color data from the second side.

In the illustrated embodiment, the ILS 44 and first scanner 48 are positioned upstream of the second print engine 28. However, it is also contemplated that they may be positioned downstream of the second print engine 28, e.g., below the inverted sheet 14. This allows the first color data 46 to reflect any changes to the first side image which may have resulted from passing through the second print engine, such as the effects of additional drying, pressure, or the like.

In the case of an inkjet printing system, the print engines 24, 28 may each include a printhead assembly, which includes an array of inkjet nozzles that deposit droplets of one or more ink compositions onto the upper surface 26 of the sheet 14. Each ink composition may be an aqueous ink composition which includes one or more colorants and water. The ink composition may alternatively or additionally include one or more non-aqueous solvents and/or radiation curable (i.e., polymerizable) monomers. The printed sheet may be conveyed directly from the printhead assembly to a dryer, or other image fixing device (such as a UV curing station), where the wet image is dried, cured and/or otherwise fixed more permanently to the sheet.

In the case of xerographic print engines, the first and second print engines 24, 28 may each include a photoconductive surface, such as a belt or drum, on which the image is formed by electrostatic attraction of toner particles and then transferred, directly or indirectly to the sheet, and a fuser, which applies heat and/or pressure to fix the image more permanently to the sheet. Other print engines are also contemplated.

The first and second color measurement devices 22, 48 may be positioned downstream of the fixing device (fuser or dryer) of the first print engine 24 and the third color measurement device 52 may be positioned downstream of the fixing device of the second print engine 28. The third color measurement device 52 acquires color data for the recto side of a sheet which has passed through the first and second print engines 24, 28. In the illustrated embodiment, each of the components 24, 44, 48, 28, and 52 is positioned on the same side of the paper path 16, e.g., above the sheets, as illustrated in FIG. 1.

The color management system 1 also includes a computer-implemented control device 60 (FIG. 1A), which may be located local to or remote from the printer 10, e.g., linked to the printer 10 or to components thereof by wired or wireless connections 62, such as a computer network and/or Internet connection. The control device 60 receives the color data 46, 50, 54 from the first, second, and third color measurement devices 44, 48, and 52 and outputs information based thereon, such as first and/or second calibration data 64, 66 for one or both of the print engines 24, 28 and/or third calibration data 68 for calibrating the second scanner 52. In particular, the control device 60 computes color differences ($\Delta E$) 70 between the first and second color data 46, 50 and applies a correction ($\Delta E'$) 72 to the third color data 54, which is based on the computed color differences 70, to generate corrected color data (CCD) 74, which may be used to compute the first, second, and/or third calibration data 64, 66, 68.

Figure 2:
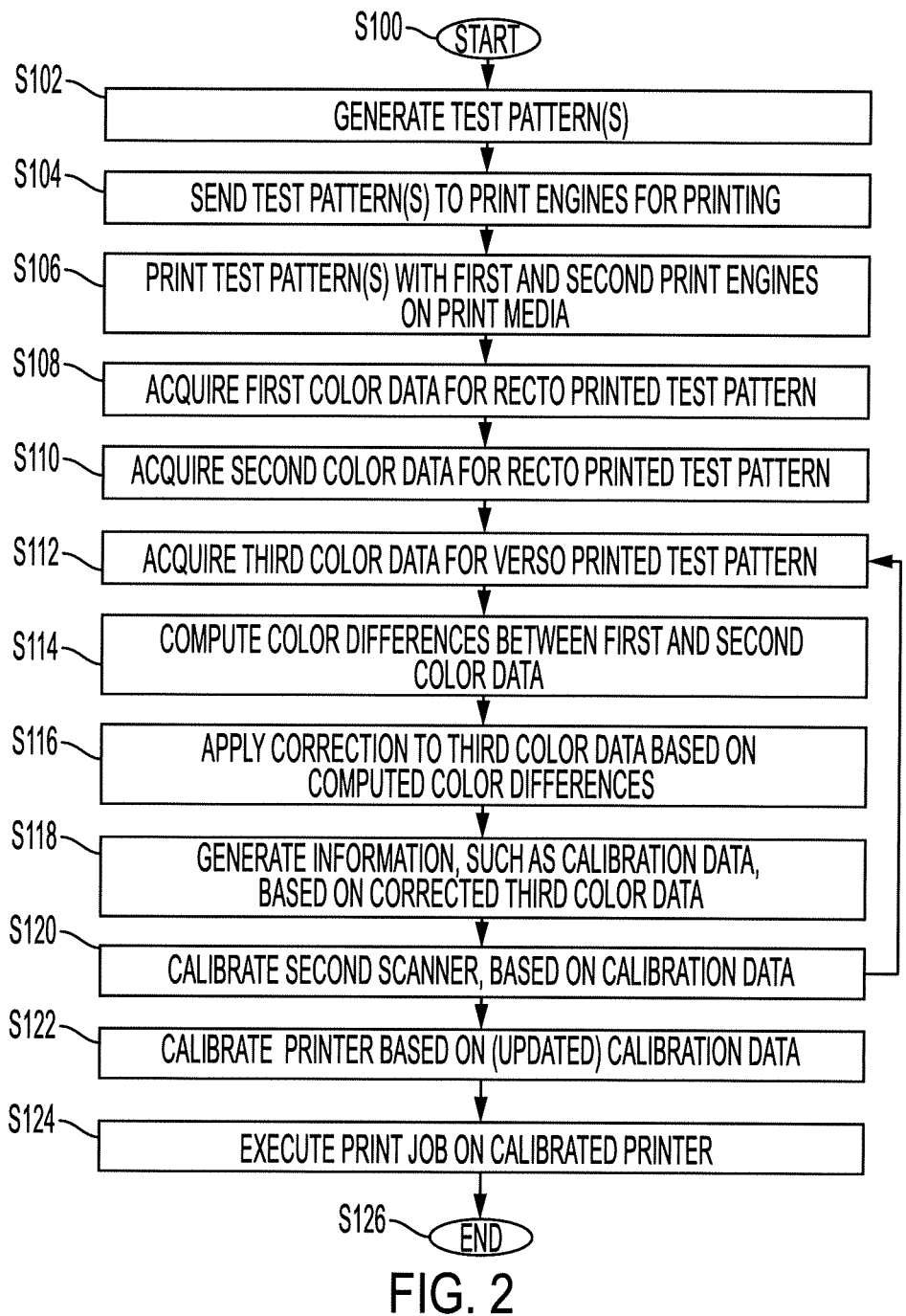
FIG. 2 illustrates a method for color analysis in a color management system in accordance with another aspect of the exemplary embodiment.

The control device 60 includes memory 80 which stores software instructions 82 for performing the method described herein with reference to FIG. 2 and a processor 84, in communication with the memory, for executing the instructions. Memory 80 may also store the test pattern 40, e.g., as a digital document. An input device 86 receives the color data 46, 50, 54 from the measurement devices 44, 48, 52, which may be stored in memory 80, during processing. An output device 88 outputs the calibration information 64, 66, 68. Hardware components 80, 84, 86, 88 may be communicatively connected by links, such as a data/control bus 90.

Figure 3:
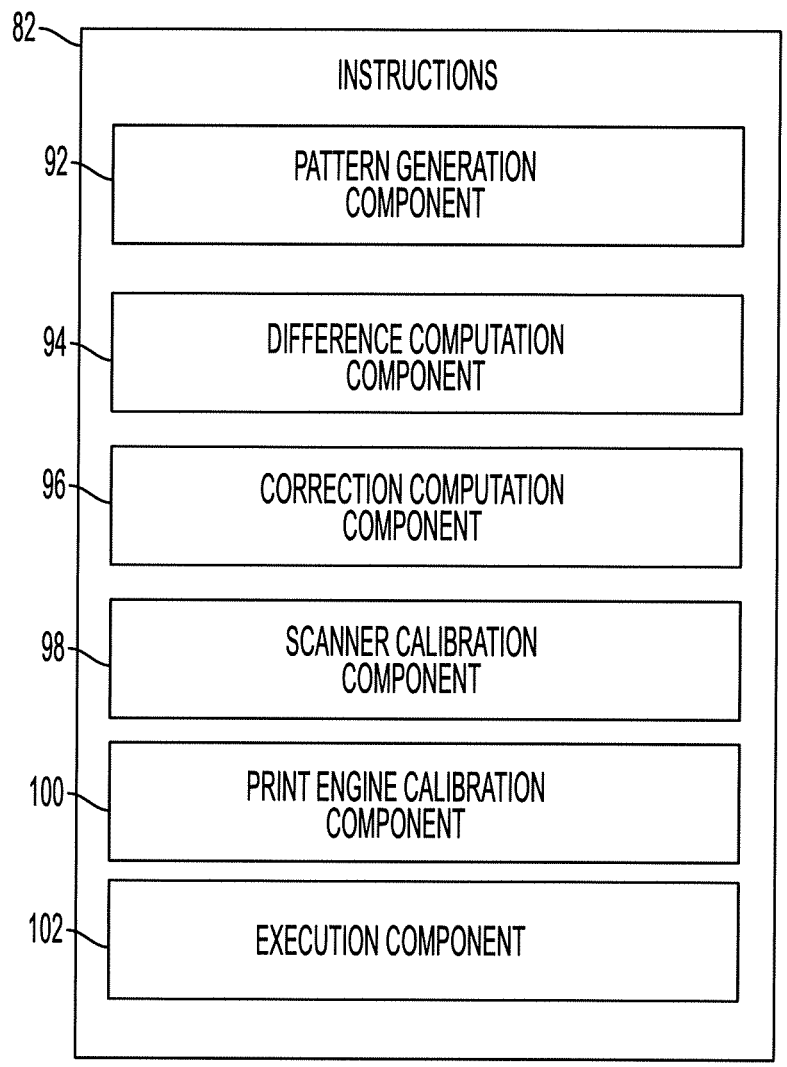
FIG. 3 illustrates exemplary instructions for the system of claim 1.

As illustrated in FIG. 3, the instructions 82 may include a pattern generation component 92, a difference computation component 94, a correction computation component 96, a scanner calibration component 98, a print engine calibration component 100, and optionally an execution component 102.

Briefly, the pattern generation component 92 generates a test pattern 40 which is sent to the print engines 24, 28 for printing on a selected print medium. In the exemplary embodiment, the identical test pattern 40 may be sent to both devices 24, 28, which are nominally identical. In other embodiments, the test patterns may contain similar patches (i.e., the same patch recipes), but may differ in some respects, e.g., fewer or more patches, different arrangement of patches, different size of patches, or a combination thereof. Each test patch may be associated, in memory with a respective reference color ("Ref.") 104 (e.g., predetermined reference L*, a*, and b* values for the printed patch).

The difference computation component 94 receives the first and second color data 46, 48, optionally after conversion of one or both of the color data into a common color space, and computes color differences 70 between them. In particular, for each patch, a color difference $E(\lambda)$ is computed, for example, by subtracting reflectance values, respectively, to generate a vector containing a set of difference values, one for each wavelength of the reference device.

The correction computation component 96 receives the third color data 54, optionally after conversion of the third color data into the common color space, and applies corrections 72 to the third color data which are based on or correspond to the computed color differences 70, to generate corrected color data (CCD) 74. One method for performing the correction is described below, which weights the corrections based on a degree of divergence between the second and third color data.

The scanner calibration component 98 generates calibration data 68 for calibrating the second scanner 52, based on the corrected color data (CCD) 74.

The printer calibration component 100 optionally generates calibration data 64 and/or 66, which is used to calibrate one or both of the print engines 24, 28, with the aim of reducing a difference in the colors printed by the print engines for the same input color. The calibration data 64 and/or 66 may be based on the corrected color data (CCD) 74.

The execution component 102 executes a print job on the printer 10. In particular, the execution component 100 receives color data for a document 106 to be printed (at least in part) in duplex mode, converts the color data to a suitable form for execution by the (calibrated) print engines 24, 28 and sends recto and verso color data to the respective first and second print engines, respectively for printing pages of the document in duplex mode.

In the exemplary embodiment, the color measurement devices consist of a reference color measurement device, such as an ILS 44 and a first scanner 48 (first estimated color measurement device) for the recto side (side 1) 26 of the printer and only an identical model scanner 52 (second estimated color measurement device) for the verso side (side 2) 30 of the printer (i.e., no verso side spectrophotometer or other reference color measurement device for the verso side). Printed patches are measured on the recto side using both the ILS 44 and the first scanner 48. Similar patches (i.e., generated from the same patch recipes) are measured on the verso side using the second scanner 52. The spectral estimates 54 provided by the second scanner 52 on the verso side patches are refined based on the respective differences 70 between the recto side ILS measurements 46 and the scanner estimates 50.

The control device 60 may include one or more computing devices, such as a PC, such as a desktop, a laptop, palmtop computer, portable digital assistant (PDA), server computer, cellular telephone, tablet computer, pager, combination thereof, or other computing device capable of executing instructions for performing at least a part of the exemplary method.

The memory 80 may represent any type of non-transitory computer readable medium such as random access memory (RAM), read only memory (ROM), magnetic disk or tape, optical disk, flash memory, or holographic memory. In one embodiment, the memory 80 comprises a combination of random access memory and read only memory. In some embodiments, the processor 84 and memory 80 may be combined in a single chip. Memory 80 stores instructions for performing the exemplary method as well as the processed data 70, 72, 74.

The input and output devices 86, 88, which may be separate or combined, allow the control device 60 to communicate with other devices via a computer network 62, such as a local area network (LAN) or wide area network (WAN), or the internet, and may comprise a modulator/demodulator (MODEM) a router, a cable, and/or Ethernet port.

The digital processor device 84 can be variously embodied, such as by a single-core processor, a dual-core processor (or more generally by a multiple-core processor), a digital processor and cooperating math coprocessor, a digital controller, or the like. The digital processor 84, in addition to executing instructions 82 may also control the operation of the printer 10.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or the like, and is also intended to encompass so-called "firmware" that is software stored on a ROM or the like. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

With reference to FIG. 3, a color management method which may be performed with the system of FIGS. 1 and 2 is illustrated. The method begins at S100.

At S102, if not already done, a test pattern 40 is generated. The test pattern 40 includes color data for each of a plurality of patches 42 in a form which is understood by the print engines 24, 28. For example, for each of the patches, an input value is provided for each of the colors of marking material available on the print engine, such as C, M, Y and optionally K, or in a different color space, such as RGB, which can be converted to C, M, Y and optionally K output values by the respective print engine.

At S104, the test pattern 40 is sent to the print engines 24, 28, with instructions for printing on one or more sheets 14 of a selected print medium.

At S106, the test pattern 40 is printed with the first print engine 24 on a sheet 14 of the selected print media. This may include for the first print engine, converting the input color values for each patch to CMY and optionally K input values, optionally applying a predefined first calibration function to the CMY(K) input color values for the test pattern, and printing the test pattern. The first calibration function may be a first tone reproduction curve (TRC). The TRC may be configured to reduce differences between previously-acquired first color data 46 and a predefined set of color data and/or to reduce previously-determined differences between the colors of the same patches printed by the first and second print engines, respectively. The same or a similar test pattern 40 is also printed with the second print engine 28 on a sheet 14 of the selected print media, such as the same sheet or a different sheet. This may include for the second engine, converting the input color values for each patch to CMY and optionally K input values, optionally applying a predefined second calibration function to the CMY(K) input color values for the test pattern, and printing the test pattern on the verso side of a sheet. The second calibration function may be a second tone reproduction curve, which is configured to reduce differences between previously-acquired third color data 54 and a predefined set of color data and/or to reduce previously-determined differences between the colors of the same patches printed by the first and second print engines respectively.

At S108, first color data 46 is acquired by the first color measurement device 44 for the first printed test pattern, printed at S106 on the recto side of a sheet by the first print engine 24. The first color data is sent to the control device 60, where it is stored in memory 80, optionally after conversion to a predefined color space.

The first color data 48 may include, for each patch, a reflectance measurement for each of the set of wavelengths at which the spectrophotometer performs measurements. In some embodiments, the reflectance measurements may be converted to a device-independent, perceptual color space, such as L*a*b. Other predefined color spaces, such as XYZ, xyY, $LCH_{ab}$, Luv, or $LCH_{u}v$, may alternatively be used.

At S110, second color data 50 is acquired by the second color measurement device 48 for the first printed test pattern, printed at S106 on the recto side of the sheet by the first print engine 24. The second color data 50 is sent to the control device 60, where it is stored in memory 80, optionally after conversion to estimated reflectance values. The second color data 50 may be acquired in a device-dependent, color space, such as RGB, and converted to reflectance values (or to values in a device-independent, perceptual color space, such as L*a*b) with a predefined transfer function. Different algorithms use slightly different coefficients, so the same algorithm should be used for converting between the same pair of color spaces, such as for both color data 50, 54.

At S112, third color data 54 is acquired by the third color measurement device 52 for a second printed test pattern, which was printed at S106 on the verso side of the sheet by the second print engine 28. The third color data 54 is sent to the control device 60, where it is stored in memory 80, optionally after conversion to the predefined color space.

At S114, color differences are computed between the first and second color data 46, 50. This may include, for each patch, in the predefined color space, computing a difference or a set of differences 70. This may include subtracting each reflectance value in the color data for the patch acquired by the second color measurement device from the respective value in the color data for the same patch acquired by the first color measurement device, or vice versa.

At S116, correction(s) 72 are applied to the third color data 54. The corrections are based on the computed color differences 70. This may include converting the third color data for each of the patches into the common color space to generate a set of color values (e.g. reflectance values) for each of the patches, and applying a correction to each of the color values in the common color space which is based on the difference computed at S114 for the respective patch. For example, where the third color data 54 is in RGB space, this may include converting RGB values to the predefined color space, such as reflectance values, using the same transfer function as for the second color data 50.

The corrected values 74 for each patch may then be used to calibrate the print engines 24, 28 and/or scanner 52. For example, at S118, information is generated, such as one or more of calibration data 64, 66, and 68, based on the corrected third color data 74.

At S120, one or both of the scanners 48, 52 may be (re)calibrated. The first scanner 48 may be (re) calibrated, based on calibration data 64, e.g., to reduce differences between the second color data 50 and the first color data 46. The second scanner 52 may be calibrated, based on calibration data 68, e.g., to reduce differences between the corrected values 74 and the reference values 104 (or first color data 46).

At S122, the first print engine 24 may be (re)calibrated based on the first color data 46, e.g., to reduce differences between the spectrophotometer color data 46 and the reference color data 104 for the patches. Alternatively, or additionally, the first and second print engines 24, 28 may be calibrated to reduce differences in their outputs, e.g., the calibration data 64 and/or 66 is configured to reduce subsequent differences between the first color data 46 and corrected values 74. The software converts color measurements to spectral measurements. In one embodiment, the conversion from scanner measurements to spectral estimates is performed using a matrix (i.e., a linear) transformation T, of dimension N×M where N is the number of spectra being estimated (e.g., 31 spectra) and M is the number of channels of the scanner (e.g., 3 for an RGB scanner). The spectral estimate of a patch, $S^-(\lambda)$, is estimated from the scanner channel response, RGB, of that patch using:

$$S^-(\lambda)=T*(RGB)$$

where RGB is a one-dimensional tensor of three values.

The matrix T can be computed from a set of desired outputs (the measured reference spectral outputs of all the patches $S_{all}(\lambda)$ obtained from the ILS) and inputs (the scanner RGB values of all the patches, denoted RGB). For example, the minimum mean square solution fit is found using the pseudoinverse:

$$T=S_{all}(\lambda)*RGB^{\#}=S_{all}(\lambda)*RGB^{T}*inv(RGB*RGB^{T})$$

where $RGB^{\#}$ is the true inverse of RGB and $RGB^{T}$ is the transpose of RGB.

Other transformations and their associated training methods, such as Gaussian regression, may be substituted for the linear transformation method of spectral estimation without any modifications to the subsequent description of the method.

The method may return to S104 or S112 to obtain further color measurements using the calibrated second scanner to confirm that the calibrations provide color measurements which are no more than a threshold error from the reference spectrophotometer. If not, the second scanner may be recalibrated.

At S122, one or both of the print engines 24, 28 may be calibrated based on calibration data 64 and/or 66.

At S124, a print job may be executed on the calibrated printer.

The method ends at S126.

The method illustrated in FIG. 3 may be at least partially implemented in a computer program product that may be executed on a computer, such as control device 60 and/or computing devices of the printer 10, such as computing devices of the print engines 24, 28, and/or sensors 44, 48, 52. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the control device 60, (for example, an internal hard drive of RAM), or may be separate (for example, an external hard drive operatively connected with the control device 60), or may be separate and accessed via a digital data network such as a local area network (LAN) or the Internet (for example, as a redundant array of inexpensive or independent disks (RAID) or other network server storage that is indirectly accessed by the control device 60, via a digital network).

Alternatively, the method may be at least partially implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphics card CPU (GPU), or PAL, or the like. In general, any computing device or combination of computing devices, capable of implementing a finite state machine that is in turn capable of implementing the flowchart shown in FIG. 3, can be used to implement the method.

As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

In the exemplary system and method, the scanner 52 (and optionally also scanner 48) is trained to operate as a spectrophotometer 44, by learning a function that matches a set of scanner RGB values for a measured patch set to a set of spectral values of that patch set measured by the reference spectrophotometer 44. The training is employed since each scanner can only provide 3 values (R,G,B) for each patch 42, from which a larger set spectral values are estimated (e.g., 31 in the case of the ILS measuring 31 spectral values). The method benefits from the fact that the print engines produce all their colors using a limited number of inks, usually from 4 to 8. The number of degrees of freedom of the spectrum that a print engine can print on a given printer is therefore much less than the 31 spectral values measured by a typical ILS 44. In general, however, the RGB space of each scanner does not usually completely contain the printable space, as the print engine has more than three degrees of freedom (e.g., the spectrum of cyan and magenta together cannot be represented by a linear combination of the cyan and magenta). The training of the RGB scanners 48, 52 to output estimated values comparable to the ILS is therefore specific to the inks and papers used by the printer. This makes training a scanner to an ILS difficult, as it is best done for multiple paper/ink configuration. Scanner training can be performed using multiple inks and papers to get a more generalized fit, but then the scanner as an ILS will be suboptimal in any specific configuration.

Further, even in any specific configuration the training is performed using a patch set sparsely sampling color space and a parametric model is used to generalize to all color space (e.g., a matrix fit or non-linear smooth curve). Colors measured that are not close to any of the patches used in training can have larger error than other colors. The patch set of scanner training can get larger as the desired accuracy increases.

If a scanner is trained globally to provide reasonable estimate of spectra, then in any given configuration (ink/paper combination) there will be a fixed error between the actual (or ILS) spectrum $S(\lambda)$ of the print at a given wavelength $\lambda$, and the scanner estimate of that spectrum $S^\sim(\lambda)$. The scanner spectral error function can be defined as:

$$E(\lambda|S(\lambda))=(\lambda)-S^\sim(\lambda) \qquad (1)$$

The function $E(\lambda|S(\lambda))$ will generally vary for every ink/paper configuration, but it is fixed for a given configuration. It is a function of the patch response $S(\lambda)$, each patch thus has a different error function.

In the duplex case, the recto and verso side of the printer operate with the same paper and the same ink set, so the function $E(\lambda|S(\lambda))$ is nearly identical for both sides (assuming that the scanners 48, 50 are similar). Additionally, the same patch set is printed on the recto and verso side for calibration and profile building. Under a certain set of constraints (i.e., verso side printing and scanning is similar to recto side), it can be assumed that:

$$E(\lambda|S_{P_r}(\lambda))=S_{P_r}(\lambda)-S_{P_r}^\sim(\lambda)\approx S_{P_v}(\lambda)-S_{P_v}^\sim(\lambda)=E(\lambda|S_{P_v}(\lambda)) \qquad (2)$$

where:

$S_{P_r}(\lambda)$ is the actual color (e.g., measured by ILS 44) of a patch printed on the recto side 26 at a wavelength $\lambda$, with $S_{P_r}$ denoting a corresponding vector representing the spectrum over multiple wavelengths (e.g., 31 wavelengths), $S_{P_r}^\sim(\lambda)$ is the estimated color of the patch on the recto side 26 from the recto side scanner 48, with $S_{P_r}^\sim$ denoting a corresponding vector representing the spectrum over multiple wavelengths (e.g., the same 31 wavelengths), $S_{P_v}(\lambda)$ is the actual color of a similar patch (same CMYK) printed on the verso side 30 at wavelength $\lambda$, with $S_{P_v}$ denoting a corresponding vector representing the spectrum over multiple wavelengths (e.g., the same 31 wavelengths), which would be expected if an ILS analogous to ILS 44 were to be used; and $S_{P_v}^\sim(\lambda)$ is the estimated color of the patch on the verso side 30 from the verso side scanner 52 at wavelength $\lambda$, with $S_{P_v}^\sim$ denoting a corresponding vector representing the spectrum over multiple wavelengths (e.g., the same 31 wavelengths).

This method assumes that three constraints are met. The first is that the recto and verso scanners 48, 52 are similar, such that if substituted for each other, would yield similar results. For example, the scanners are of the same type and operate at the same conditions (e.g., with respect to viewing depth). Similarly, the recto side and verso side printing should similar (i.e., the same CMYK formulation produces similar colors on both sides). This holds for most ink jet printers, since they generally use the same heads, ink, halftone, and so forth. The last constraint is that the spectral error function, $E(\lambda|S(\lambda))$, is smooth and continuous. This has held in practice when the scanner spectral fitting function is relatively smooth, i.e., given: $E((\lambda|S_1(\lambda))=S_1(\lambda)-S_1^\sim(\lambda)$, $E((\lambda|S_2(\lambda))=S_2(\lambda)-S_2^\sim(\lambda)$, and $|S_1(\lambda)-S_2(\lambda)|<\varepsilon$ then $E(\lambda|S_1(\lambda)|-E(\lambda|S_2(\lambda)|<\delta$, and $|S_1^\sim(\lambda)-S_2^\sim(\lambda)|<\varepsilon+\delta$, $\delta\ll\varepsilon$ (for small $\varepsilon$)

where $\varepsilon$ is the magnitude of the difference between the spectra of two patches, $S_1(\lambda)$ and $S_2(\lambda)$ that are close in color space and $\delta$ is the magnitude of the difference between error functions of those two patches.

In other words, small changes in the input spectral response map to small changes in the output spectral estimate and the error function is very similar for similar patches. This typically holds as long as the spectral estimation function is not region based (i.e., having different fitting models in different parts of the color space) and therefore has discontinuities.

When these three conditions hold, then equation (2) is valid and can be rewritten as:

$$\hat{S}_{P_v}(\lambda)=S_{P_v}^\sim(\lambda)+[S_{P_r}(\lambda)-S_{P_r}^\sim(\lambda)]\approx S_{P_r}(\lambda) \qquad (4)$$

where, $\hat{S}_{P_v}(\lambda)$ is the modified estimate of spectral response of the verso side; the original scanner estimate updated by the scanner spectral error. The scanner spectral error for a given patch $P_r$ for the recto (first side) scanner 48 (the terms in the brackets [ ]), is used as an estimate of the scanner spectral error for an equivalent patch $P_v$ for the verso (second side) scanner 52.

However, in some instances, the spectral estimate of commensurate patches on the recto and verso sides are not similar ($S_{P_r}^\sim(\lambda)$ is not $\approx S_{P_v}^\sim(\lambda)$). In this case, it can be assumed that at least one of the three conditions under which equation (4) is valid is not met. In that case the spectral error of the recto side is considered less useful in correcting the verso side spectral estimate. Equation (4) can be modified to place less weight on the recto side spectral error in such instances, as follows:

$$\hat{S}_{P_v}(\lambda)=S_{P_v}^\sim(\lambda)+[S_{P_r}(\lambda)-S_{P_r}^\sim(\lambda)]*W(\hat{S}_{P_r}^\sim(\lambda)-S_{P_r}^\sim(\lambda)) \qquad (5),$$

or an approximation or function thereof.

where the function $W(S_{P_v}^{\sim}(\lambda)-S_{P_r}^{\sim}(\lambda))$ is chosen to be at or near unity when the scanner spectral estimates of the recto and verso sides are close to each other and decreases towards zero as they diverge. In the exemplary embodiment, the spectral estimate for the verso side is equivalent to just the scanner estimate $S_{P_v}^{\sim}(\lambda)$ in the case of a large difference between the recto and the verso side scanner responses.

One suitable weighting function, W( ), is a Gaussian function. In that case, equation (5) becomes:

$$\hat{S}_{Pv}(\lambda)=S_{P_v}^{\sim}(\lambda)+[S_{P_r}(\lambda)-S_{P_r}^{\sim}(\lambda)]* e^{-|S_{Pv}^{\sim}(\lambda)-S_{Pr}^{\sim}(\lambda)|^2/2\sigma^2} \quad (6)$$

where σ is a standard deviation of the Gaussian function, or an approximation or function thereof.

Applying Equation 6, for each of a set of wavelengths, such as at least 5 or at least 10 wavelengths, the corrected spectral estimate for a second side patch printed from the same CMYK input as a first side patch is computed as the spectral estimate for the second side plus the difference (in square brackets) between the "true" spectral value for the first side patch (output by the ILS) and the estimated spectral value for the first side (output by the first scanner), the difference being multiplied by an exponentially decreasing function of the square of difference between the spectral estimate for the second side and the spectral estimate for the first side (the $L_2$ norm function ‖ ensuring that the difference measure of $S_{P_v}^{\sim}(\lambda)-S_{P_r}^{\sim}(\lambda)$ will always be non-negative), divided by a function of the standard deviation of a given Gaussian function (in this case twice the square of the standard deviation). When the difference $S_{P_v}^{\sim}(\lambda)-S_{P_r}^{\sim}(\lambda)$ is 0, then the weighting W is equal to 1 and when the difference is large, the weighting tends towards 0.

A suitable value for σ can be computed from the patches measured by both the reference spectrophotometer (e.g., an ILS) and estimated from the scanner color data values. For each pair of patches an abscissa and ordinate can be generated that will be used to fit a Gaussian to estimate σ; for a set of P patches P!/(2! (P−2)!), such pairs of patch values exist. The abscissa value generated from each pair of patches corresponds to the distance between the spectra of the two patches, i.e., $x_{ab}=|S_a(\lambda)-S_b(\lambda)|$ (and the ordinate value for that pair can be:

$$\gamma_{ab}=\max(0,<E(\lambda|S_a(\lambda)),E(\lambda|S_b(\lambda))>/\max(|E(\lambda|S_a(\lambda))|, |E(\lambda|S_b(\lambda))|)2)$$

where < > represents an inner product between two vectors.

By using the inner product, the ordinate values represent how well aligned the two error functions are, and result in a maximum value of one. The full set of abscissa and ordinate values calculated can be fit to a Gaussian function to help determine the standard deviation of the weighting function used in (6). In one embodiment, instead of using all pairs, a subset of that space can be used, as the number of pairs tends to be large. For example, only points whose error function magnitudes are larger than a specified amount (e.g., the median or 75th percentile error function magnitude), are used.

While a Gaussian function is used in the exemplary embodiment, other non-linear functions, such as stepwise functions, or linear functions, as illustrated, for example, in FIGS. 4-6, may be employed. In another embodiment, Equation 4 is applied when there is no more than a threshold difference between the spectral estimates of the recto and verso sides. Above this difference, no correction to the verso side is made.

In the exemplary method, for every patch the scanner spectral error on the recto side is calculated using the scanner spectral estimation from the recto side and the recto side ILS $(S_{Pr}(\lambda)-S_{Pr}^{\sim}(\lambda))$.

For every patch, the scanner spectral error of the verso side is estimated using the scanner spectral error of the recto side with the same patch recipe $(S_{Pv}^{\sim}(\lambda)-S_{Pr}^{\sim}(\lambda))$.

For every patch, the scanner spectral error of the verso side is weighted by a weighting function W that is parameterized by the difference between the recto (first side) and verso (second side) scanner spectral estimates (e.g., $W=e^{-|S_{Pv}^{\sim}(\lambda)-S_{Pr}^{\sim}(\lambda)|^2/2\sigma^2}$).

In this way, for every patch the verso side spectral estimation can be improved by augmenting the scanner spectral estimate with the scanner spectral error estimate.

Figure 7:
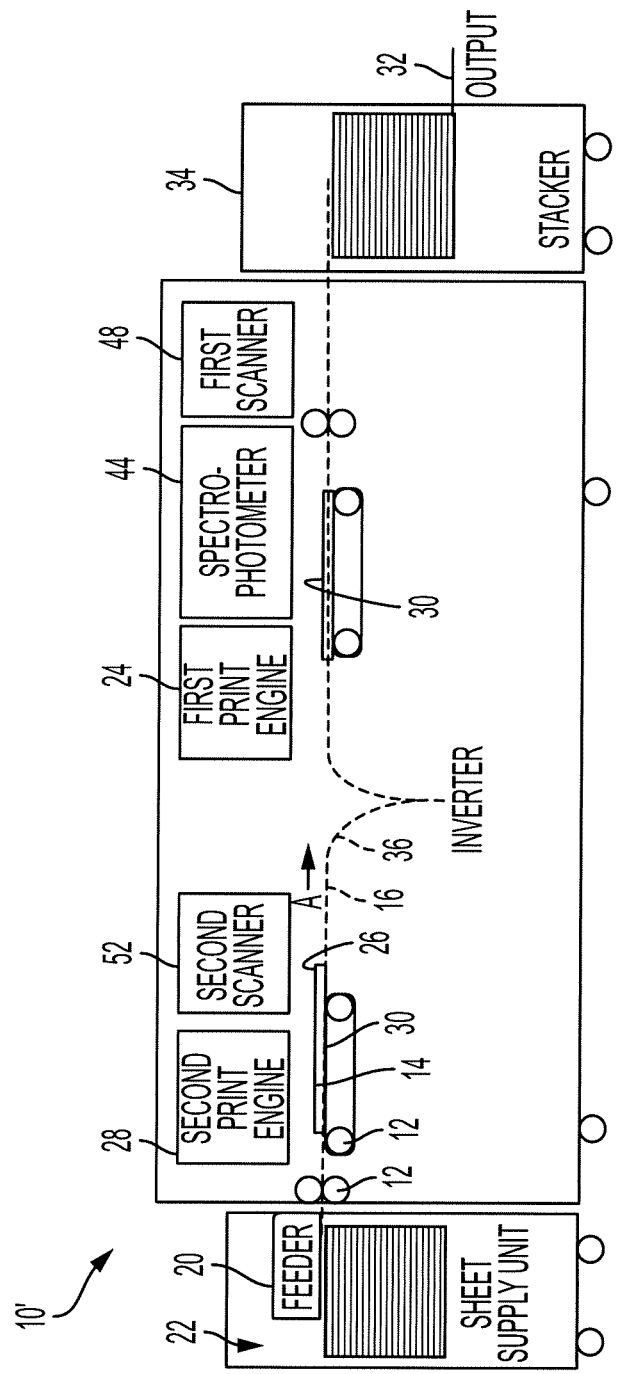
FIG. 7 is a functional block diagram of an illustrative color management system in accordance with another aspect of the exemplary embodiment.

FIG. 7 illustrates another embodiment of a printer 10', which may be similar to the printer of FIG. 1, except as noted. In the embodiment of FIG. 7, the print engines and sensor positions are reversed, such that the spectrophotometer 44 is associated with the downstream print engine 24. Spectrophotometer 44 and scanner 48 are both downstream of the print engine 24 and acquire color measurements for the verso side 30 (considered here the first side) of the sheet 14. Scanner 52 acquires color measurements for the recto side 26 (considered here the second side) of the sheet 14.

The method of FIG. 2 can be performed with the printer of FIG. 7, but in this case, S108 and S110 acquire color data for the verso printed test pattern and S112 acquires color data for the recto printed test pattern.

The system and method may utilize a printer's existing scanner(s) that are conventionally used for missing jet detection and/or uniformity correction.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A color management system comprising:
   a first image forming device which prints a test pattern comprising a plurality of color patches on a first side of a sheet of print media;
   a second image forming device which prints the test pattern on a second side of the sheet of print media, the second side being opposite the first side;
   a paper path on which the sheet is transported between the first image forming device and the second image forming device;
   a first sensor which acquires first color data for a color patch in the test pattern printed by the first image forming device on the first side of the sheet of print media, the first color data comprising a spectral measurement $S_{Pr}(\lambda)$ for each of a predefined set of wavelengths λ;
   a second sensor which acquires second color data for the color patch in the test pattern printed by the first image forming device on the second side of the sheet of print media, the second color data comprising a spectral estimate $S_{Pr}^{\sim}(\lambda)$ for each of the predefined set of wavelengths;
   a third sensor which acquires third color data for a corresponding color patch in the test pattern printed by the second image forming device, the third color data comprising a spectral estimate $S_{P_v}\tilde{}(\lambda)$ for each of the predefined set of wavelengths; and a processor, which executes instructions to apply a correction to the third color data $S_{P_v}\tilde{}(\lambda)$, wherein the correction to the spectral estimate $S_{P_v}\tilde{}(\lambda)$ for each of the predefined set of wavelengths is an optionally-weighted function of a difference between the first color data and the second color data, the difference being $[S_{P_r}(\lambda)-S_{P_r}\tilde{}(\lambda)]$.

2. The system of claim 1, wherein the first sensor comprises a spectrophotometer, which makes spectral measurements in a first color space.

3. The system of claim 2, wherein the second and third sensors each comprise a color scanner, each of the color scanners providing color values in a second color space which are converted to spectral estimates in the first color space.

4. The system of claim 1, wherein:
the first sensor acquires the first color data for the color patch in the test pattern printed on a first side of a sheet;
the second sensor acquires the second color data for the color patch in the test pattern printed on the first side of a sheet; and
the third sensor acquires the third color data for the corresponding color patch in the test pattern printed on a second side of a sheet.

5. The system of claim 1, further comprising at least one calibration component which calibrates at least one of: the first image forming device, the second image forming device, and the third sensor.

6. The system of claim 1, wherein the first and second image forming devices each comprise a print engine, each of the print engines printing the test pattern with a same set of colorants.

7. The system of claim 1, wherein the correction applied to the third color data is also a function of a difference between the third color data and the second color data.

8. The system of claim 1, wherein the predefined set of wavelengths comprises at least 5 wavelengths.

9. A color management system comprising:
a first image forming device which prints a test pattern comprising a plurality of color patches on a first side of a sheet; a second image forming device which prints the test pattern on a second side of a sheet;
a paper path on which the sheet is transported between the first image forming device and the second image forming device;
a first sensor which acquires first color data for a color patch in the test pattern printed by the first image forming device;
a second sensor which acquires second color data for the color patch in the test pattern printed by the first image forming device;
a third sensor which acquires third color data for a corresponding color patch in the test pattern printed by the second image forming device; and
a processor, which executes instructions to apply a correction to the third color data, wherein the correction applied to the third color data is computed according to:

$$\hat{S}_{P_v}(\lambda)=S_{P_v}\tilde{}(\lambda)+[S_{P_r}(\lambda)-S_{P_r}\tilde{}(\lambda)]*W(S_{P_v}\tilde{}(\lambda)-S_{P_r}\tilde{}(\lambda)),$$

or a function thereof,
where:
$\hat{S}_{P_v}(\lambda)$ is corrected color data at wavelength $\lambda$;
$S_{P_v}\tilde{}(\lambda)$ is the third color data at wavelength $\lambda$;
$S_{P_r}(\lambda)$ is the first color data at wavelength $\lambda$;

$S_{P_r}\tilde{}(\lambda)$ is the first color data at wavelength $\lambda$, and
W is a function which reduces $[S_{P_r}(\lambda)-S_{P_r}\tilde{}(\lambda)]$ as $(S_{P_v}\tilde{}(\lambda)-S_{P_r}\tilde{}(\lambda))$ increases.

10. The system of claim 9, wherein W is a non-linear function.

11. The system of claim 9, wherein W is a gaussian function.

12. The system of claim 11, wherein the correction applied to the third color data is computed according to:

$$\hat{S}_{P_v}(\lambda)=S_{P_v}\tilde{}(\lambda)+[S_{P_r}(\lambda)-S_{P_r}\tilde{}(\lambda)]*e^{-|S_{P_v}\tilde{}(\lambda)-S_{P_r}\tilde{}(\lambda)|^2/2\sigma^2},$$

where $\sigma$ is a standard deviation of the Gaussian function, or a function thereof.

13. The system of claim 1, wherein the first image forming device is upstream of the second image forming device.

14. A color management method comprising:
with a first sensor, acquiring first color data for a color patch of a test pattern printed on a first side of a first sheet of print media by a first image forming device, the first color data comprising a spectral measurement for each of a predefined set of wavelengths;
with a second sensor, acquiring second color data for the same color patch in the test pattern printed by the first image forming device, the second color data comprising a spectral estimate for each of the predefined set of wavelengths;
with a third sensor, acquiring third color data for a corresponding color patch in the test pattern printed by a second image forming device on a second side of the first sheet of print media, opposite to the first side, or on a second side of a second sheet of print media, the second color data comprising a spectral estimate for each of the predefined set of wavelengths; and
with a processor, applying a correction to the third color data, wherein the correction to the spectral estimate for each of the predefined set of wavelengths is computed as a function of a difference between the spectral measurement in the first color data and the spectral estimate in the second color data for the respective wavelength in the predefine set of wavelengths.

15. The color management method of claim 14, wherein the correction applied to the third color data is also a function of a difference between the third color data and the second color data.

16. The color management method of claim 14, wherein the first image forming device is connected with the second image forming device by a paper path.

17. The color management method of claim 14, wherein the acquiring of the first, second, and third color data and the applying the correction to the third color data is performed for each of a plurality of patches of the test pattern.

18. The color management method of claim 14, wherein the applying of the correction includes:
computing a spectral error for the second sensor as a difference between the first color data and the second color data;
computing a spectral error for the third sensor as a difference between the first color data and the third color data; and
computing corrected color data comprising weighting the spectral error for the third sensor with a weighting function W that is parameterized by a difference between the third color data and the second color data.

19. The color management method of claim 14, further comprising:

calibrating at least one of: the first image forming device, the second image forming device, and the third sensor, based on the computed corrected color data.

20. A color management system comprising:
memory which stores instructions for:
for each a set of at least five wavelengths, acquiring first color data for a color patch of a test pattern printed by an associated first image forming device on a recto aide of a sheet;
for each of the set of wavelengths, acquiring second color data for the color patch in the test pattern printed by the associated first image forming device;
for each of the set of wavelengths, acquiring third color data for a corresponding color patch in the test pattern printed by an associated second image forming device on a recto side of a sheet which has passed through the first image forming device; and
applying a correction to the third color data, including, for each of the set of wavelengths, computing a correction which is a function of a difference between the first color data for the wavelength and the second color data for the wavelength; and
a processor, which executes the instructions.

* * * * *